United States Patent
Di Marco et al.

(10) Patent No.: US 11,246,132 B2
(45) Date of Patent: Feb. 8, 2022

(54) MESSAGE TRANSMISSION WITH REDUCED INTERFERENCE

(71) Applicant: Telefonaktiebolaget LM Ericsson (publ), Stockholm (SE)

(72) Inventors: Piergiuseppe Di Marco, Teramo (IT); Jonas Kronander, Knivsta (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 110 days.

(21) Appl. No.: 16/759,424

(22) PCT Filed: Nov. 28, 2017

(86) PCT No.: PCT/EP2017/080637
§ 371 (c)(1),
(2) Date: Apr. 27, 2020

(87) PCT Pub. No.: WO2019/105523
PCT Pub. Date: Jun. 6, 2019

(65) Prior Publication Data
US 2020/0337049 A1    Oct. 22, 2020

(51) Int. Cl.
*H04J 3/00* (2006.01)
*H04W 72/04* (2009.01)
*H04W 4/80* (2018.01)

(52) U.S. Cl.
CPC ......... *H04W 72/0446* (2013.01); *H04W 4/80* (2018.02)

(58) Field of Classification Search
CPC ....... H04W 72/02; H04W 72/04; H04W 4/80; H04W 72/0446

(Continued)

(56) References Cited

U.S. PATENT DOCUMENTS

| 1,043,743 | A  | * | 11/1912 | Westerstrom | .......... | A47C 17/62 |
|           |    |   |         |             |            | 5/3        |
| 7,545,941 | B2 | * | 6/2009  | Sovio       | .................... | H04W 12/06 |
|           |    |   |         |             |            | 380/270    |

(Continued)

OTHER PUBLICATIONS

International Search Report and Written Opinion of the International Searching Authority, PCT/EP2017/080637, dated Jul. 30, 2018, 14 pages.

(Continued)

*Primary Examiner* — Marceau Milord
(74) *Attorney, Agent, or Firm* — Christopher & Weisberg, P.A.

(57) ABSTRACT

Messages are transmitted to a target device over a wireless network comprising a primary channel in which first messages are transmitted in a random access procedure, and a secondary channel in which second messages are transmitted using a dedicated access procedure, wherein each of the first messages comprises a pointer to the secondary channel, each first message comprising information about the transmitting device and the target device. For each of the first and second message, a transmission opportunity comprising a time slot for transmitting the corresponding message is selected and the primary channel is scanned to determine, based on the received first messages, whether a second message will be transmitted in the time slots selected for the first or second message in which the transmitting device or the target device is involved. The selected transmission opportunities are confirmed or amended based on a result of the scanning.

20 Claims, 6 Drawing Sheets

(58) Field of Classification Search
USPC .......................................... 370/336, 342, 252
See application file for complete search history.

(56) References Cited

U.S. PATENT DOCUMENTS

| | | | | |
|---|---|---|---|---|
| 8,484,466 | B2* | 7/2013 | Marin | H04L 9/0841 |
| | | | | 713/168 |
| 8,538,334 | B2* | 9/2013 | Inagaki | H04W 8/005 |
| | | | | 455/41.2 |
| 8,966,255 | B2* | 2/2015 | Koyama | H04W 12/06 |
| | | | | 713/168 |
| 10,148,453 | B2* | 12/2018 | Batra | H04L 12/40058 |
| 2006/0239296 | A1* | 10/2006 | Jinzaki | H04L 12/64 |
| | | | | 370/468 |
| 2015/0082427 | A1* | 3/2015 | Ivanchykhin | H04L 63/1466 |
| | | | | 726/22 |
| 2015/0245369 | A1* | 8/2015 | Heydon | G06F 21/44 |
| | | | | 370/329 |
| 2015/0312858 | A1* | 10/2015 | Kerai | H04L 65/607 |
| | | | | 370/311 |
| 2017/0244576 | A1* | 8/2017 | Batra | H04W 56/0025 |
| 2017/0303070 | A1 | 10/2017 | Batra et al. | |
| 2020/0275459 | A1* | 8/2020 | Skillermark | H04W 72/12 |

OTHER PUBLICATIONS

Piergiuseppe Di Marco et al; "Performance Evaluation of the Data Transfer Modes in Bluetooth 5", IOT and Machine Type Communication, IEEE Communications Standards Magazine, XP011660742, Jun. 2017, pp. 1-6.
Marc Liberatore et al, "Maximizing Transfer Opportunities in Bluetooth DTNs", Proceedings CONEXT '06 Proceedings of the 2006 ACM CONEXT Conference, ACM, New York, NY, USA, Dec. 4, 2006, XP5830103, 12 Pages.
Bluetooth SIG Proprietary, "Bluetooth Core Specification" Version 5.0, Dec. 6, 2016, pp. 1-2822.

* cited by examiner

MESSAGE TRANSMISSION WITH REDUCED INTERFERENCE

This application is a 35 U.S.C. § 371 national stage application of PCT International Application No. PCT/EP2017/080637 filed on Nov. 28, 2017 the disclosure and content of which is incorporated by reference herein in its entirety.

TECHNICAL FIELD

The present application relates to a method for transmitting, by a transmitting device, messages to a target device over a wireless network. Furthermore the corresponding transmitting device configured to transmit the messages to the target device is provided together with a computer program comprising program code and a carrier comprising the computer program.

BACKGROUND

The Bluetooth standard defines a connectionless data transfer mode based on a set of channels, the advertising channels, in which devices can broadcast data that can be received by other devices located in the radio range. FIG. 1 shows an example where a source device uses the three advertising channels 10 having channel numbers 37, 38 and 39 transmitting data to a destination such as a target device where the data is received in one of the advertising channels. Accordingly a transmitting device uses the advertising channels 10 to transmit data to a target device which receives the data in one of the advertising channels. According to the Bluetooth specification v4.2 the three channels 10 are used for advertising and the other 37 channels 0-36 are used for dedicated data transmission between connected devices.

The Bluetooth 5 specification describes a feature referred to as extended advertising. FIG. 2 shows an operation of the extended advertising mode. Instead of transmitting all the advertising data directly on the advertising channels 10 as shown in FIG. 1, in the extended advertising mode the packet 23 transmitted in the advertising channels 10 contains a pointer to one of the data channels (for example channel 16) denoted as secondary advertising channel 20 in which the actual payload 26 is transferred. Accordingly each of the transmitting device and the receiving device have primary advertising channels 10 and secondary advertising channels 20 configured, wherein the payload is transmitted in the secondary advertising channels 20. Hence a broadcasting device transmits the short packet 23 on each of the advertising channels pointing to a secondary advertising channel 20 in which the data is transmitted. The time from the pointer on the primary advertising channels 10 and the transmission of the extended advertising in the secondary advertising channel 20 depends on the implementation of the link layer and it can be up to 2.5 seconds. As shown in FIG. 2 when using extended advertising, a scanning device is continuously scanning on one of the primary advertising channels. Once the scanning device detects an advertisement as shown by the arrow 25 it can read the pointer and from there it knows where (on which data channel, i.e., which secondary advertising channel) and when to find the payload 26 corresponding to the advertising message. The scanning device can then tune its receiver to that channel to receive the payload, in the example shown in FIG. 2 this is channel 16. In addition to the pointer information the packet 23 transmitted over the advertising channels may also contain the address of the advertising device. Compared to the regular advertising mode shown in FIG. 1 the extended advertising option allows for a reduction of the congestion in the advertising channels by offloading the transmission of payloads to the other channels.

Periodic advertising is a further enhancement enabled by Bluetooth 5. For periodic advertising the scanning device may synchronize to a sequence of advertising transmissions with a fixed time interval in the secondary advertising channels. The periodic advertisement mode is indicated with the extended advertising indication in the primary advertising data which points to an auxiliary packet containing the actual information about the periodic advertisement mode such as the interval, hopping frequency, advertiser address and so on.

In the extended advertising mode a random access procedure is used in the three primary advertising channels 10 by each transmitting device for deducing the transmission time. In the secondary advertising channels a dedicated access procedure with a scheduled transmission is used.

The present invention is applicable to any communication technology where short indicator messages are transmitted on shared resources, where the indicator message includes specification (e.g., time, resource, code, . . . ) for where the payload data will be transmitted. This invention may also be applicable to implementations of TIM (Traffic Indication Map) in 802.11, which is transmitted in a beacon by the access point to indicate when stations (STA:s) need to wake up to receive data. Other access points may read the TIM to coordinate their channel access.

Bluetooth chipsets typically implement a single antenna and a single transceiver. When the receiver is occupied transmitting or receiving on a given channel, it is not available for receiving in the other channels. In the regular advertising mode, the transmitting device repeats the packet in all three channels and the receiver is expected to be tuned to one of them. A packet is lost if more transmissions overlap on the channel where the receiver is tuned to, however here the known listen-before-talk protocols would help to mitigate the occurrence of these event.

With extended advertising and periodic advertising, the risk of collision in the primary advertising channel is reduced, due to the shorter size of the extended advertising indication compared to the legacy advertising packet. However, there is a possibility that when the advertising indication triplet is sent on the primary advertising channels by a transmitting device, that the receiver is tuned to one of the other 37 secondary channels to receive other packets. This means that the communication would fail due to an unavailability of the receiver. Here the known listen-before-talk protocols would not help as the primary advertising channels would still be found idle.

In the above described example the data transmitted in the primary advertising channels are transmitted using a random access procedure in which each device randomly selects a time for data transmission. In the other channels to which the pointer in the primary advertising channels refers, a scheduled transmission or a dedicated access procedure is used.

As shown in "Performance Evaluation of the Data Transfer Modes in Bluetooth 5" by P. Di Marco at al, IEEE Communications Standards Magazine, 1(2): 92 to 97, July 2017, extended advertising mode may suffer higher losses compared to the legacy advertising mode in a typical home automation scenario due to the receiver unavailability problem mentioned above.

SUMMARY

Accordingly a need exists to avoid the above-mentioned drawback and to reduce the losses in a scenario where different channel types, such as the primary and secondary advertising channels, are used for data transmission.

This need is met by the features of the independent claims. Further aspects are described in the dependent claims.

According to a first aspect a method is provided by a transmitting device for transmitting messages to a target device over a wireless network, wherein the wireless network comprises at least one primary channel in which first messages are transmitted in a random access procedure wherein the network furthermore comprises at least one secondary channel in which second messages are transmitted using a dedicated access procedure with scheduled transmission. Each of the first messages transmitted in the primary channel comprises a pointer to the at least one secondary channel and each first message furthermore comprises information about at least the transmitting device transmitting the first and second message and information about the target device as intended recipient of the first and second message. In this scenario the transmitting device selects for each of the first and second message transmitted by the transmitting device a transmission opportunity comprising at least a timeslot for transmitting the corresponding message to the target device. Furthermore, the transmitting device scans the primary channel in order to determine based on the received first messages whether at least one second message will be transmitted in the timeslots selected for the first or second message in which the transmitting device or the target device is involved. The transmitting device can then confirm or amend the selected transmission opportunities based on the result of the scanning.

With the scanning of the primary channel the transmitting device can determine whether a second message in the secondary channels will be transmitted in which the transmitting device or the target device is involved. When it is determined that a message will be transmitted in a timeslot in which the transmitting device or the receiving device is involved, the transmission opportunity which was selected for the first or for the second message by the transmitting device can be amended in order to avoid the risk of a collision of the transmitted data. When it is determined that no message is transmitted in the timeslots which were selected by the transmitting device for transmitting the first and the second messages, the selected timeslot may be confirmed so that the first message transmitted in the primary channel or the second message transmitted in the secondary channel can be transmitted at the timeslot as originally selected by the transmitting device.

Furthermore the corresponding transmitting device is provided. The transmitting device comprises a memory and at least one processing unit wherein the memory comprises instructions executable by the at least one processing unit wherein the transmitting device is operative to operate as mentioned above or as discussed in further detail below.

Alternatively a transmitting device is provided configured to transmit the messages to the target device over the wireless network wherein the wireless network comprises at least one primary channel in which first messages are transmitted in a random access procedure and in which at least one secondary channel is provided in which second messages are transmitted using a dedicated access procedure with scheduled transmission. Furthermore each of the first messages transmitted in the primary channel comprises a pointer to the at least one secondary channel and comprises furthermore information about the transmitting device transmitting the first and second message and information about the target device as intended recipient for the first and second message. In this scenario the transmitting device can comprise a first module configured to select for each of the first and second messages transmitted by the transmitting device a transmission opportunity comprising at least a timeslot for transmitting the corresponding message to the target device. The transmitting device can comprise a second module configured to scan the primary channel in order to determine based on the received first messages whether at least one second message will be transmitted in the timeslots selected for the first or second message in which the transmitting device or the target device is involved. The transmitting device can comprise a third module configured to confirm or amend the selected transmission opportunities based on the result of the scanning.

Furthermore a computer program comprising program code to be executed by the at least one processing unit of the transmitting device is provided, wherein execution of the program code causes the at least one processing unit to execute a method as discussed above or as discussed in further detail below.

Additionally a carrier comprising the computer program is provided wherein the carrier is one of an electronic signal, optical signal, radio signal, or computer readable storage medium.

It is to be understood that the features mentioned above and features yet to be explained below can be used not only in the respective combinations indicated, but also in other combinations or in isolation without departing from the scope of the present application. Features of the above-mentioned aspects and embodiments may be combined with each other in other embodiments unless explicitly mentioned otherwise.

DETAILED DESCRIPTION OF EMBODIMENTS

Figure 1:
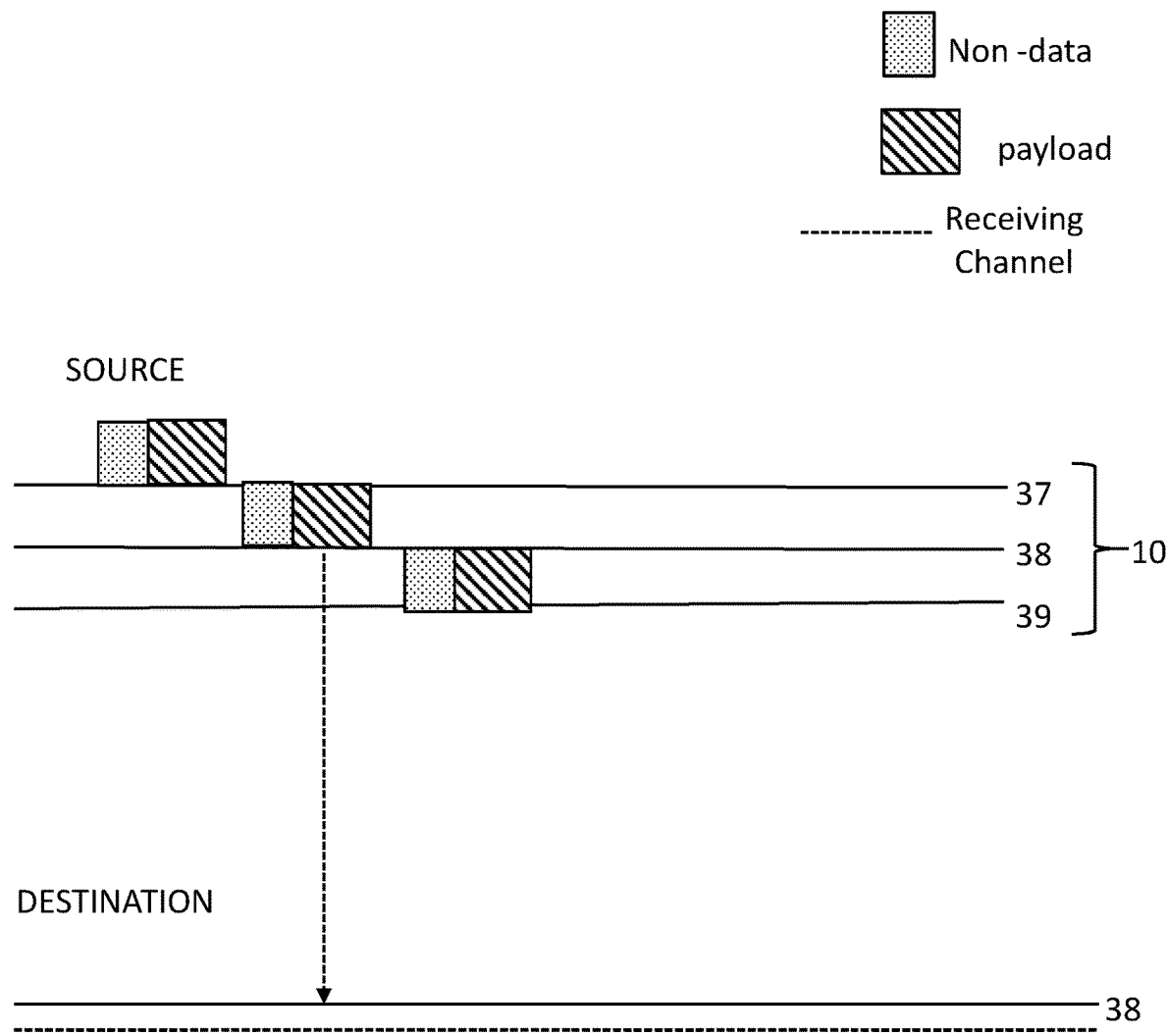
FIG. 1 shows a schematic overview of the operation of Bluetooth enabled devices in an advertising mode as known in the art.

In the following embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Functional blocks may be implemented in hardware, software, firmware, or a combination thereof.

In the following a transmitting device is disclosed which transmits messages over a wireless network. The transmitting device can refer to a device used by a person for his or her personal communication. It can be a telephone type of device, for example a cellular telephone, a mobile station, cordless phone, or a personal digital assistant type of device like laptop, note book, notepad, tablet equipped with a wireless data connection. The transmitting device may also be associated with non-humans like animals, plants, or machines. The transmitting device may be equipped with a Subscriber Identity Module, SIM.

As discussed below the present application provides a method to determine the future unavailability in the reception of a target device to which a message is transmitted by the transmitting device. Furthermore a method is disclosed to determine the future activity of other transmitting devices which could interfere with the transmitting device in the transmission. Furthermore a procedure is provided to select a transmission opportunity or time slot for a packet which can be either a legacy advertising packet or an extended advertising indication based on the above described determination so that the probability that the target device will successfully receive the transmitted data is optimized. The time slot for the packet can be understood as a time window, a time interval or a time instant when the transmission planned to start.

Figure 2:
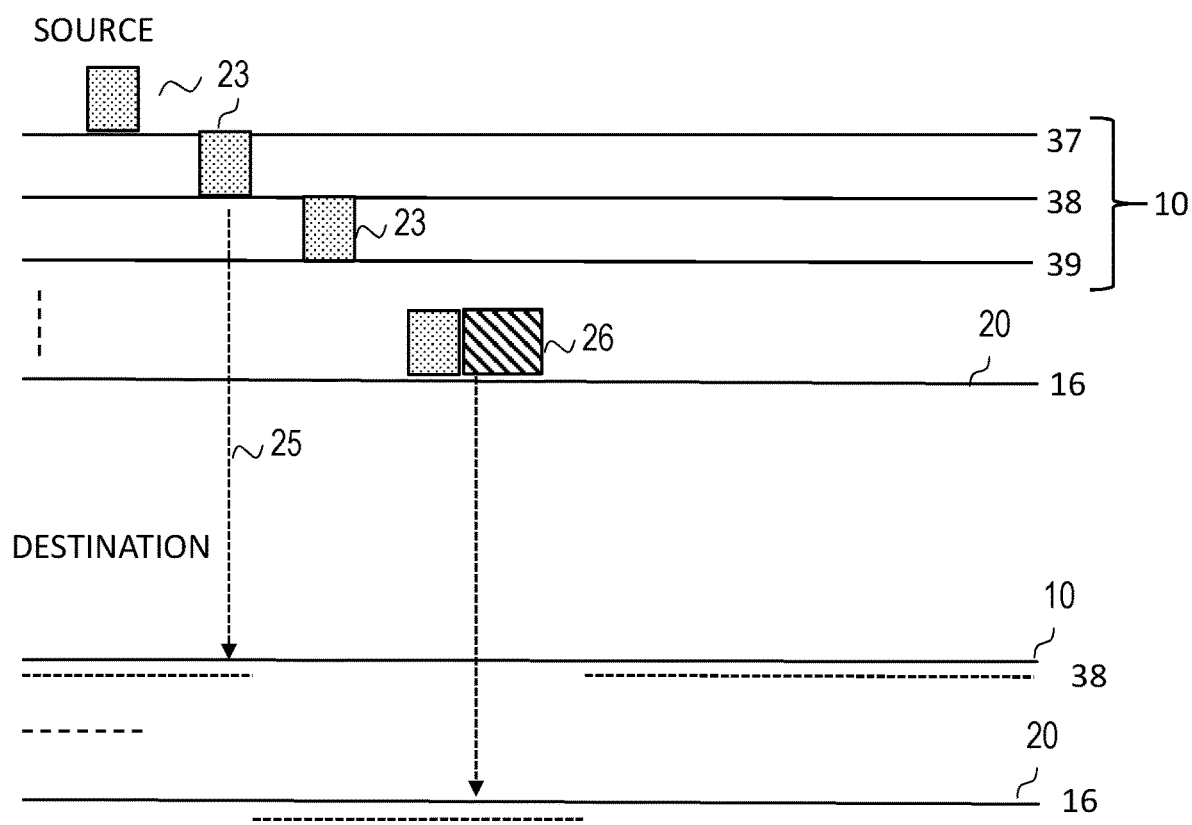
FIG. 2 shows a schematic view of an operating mode of a Bluetooth enabled device when the extended advertising mode is used as known in the art.
Figure 3:
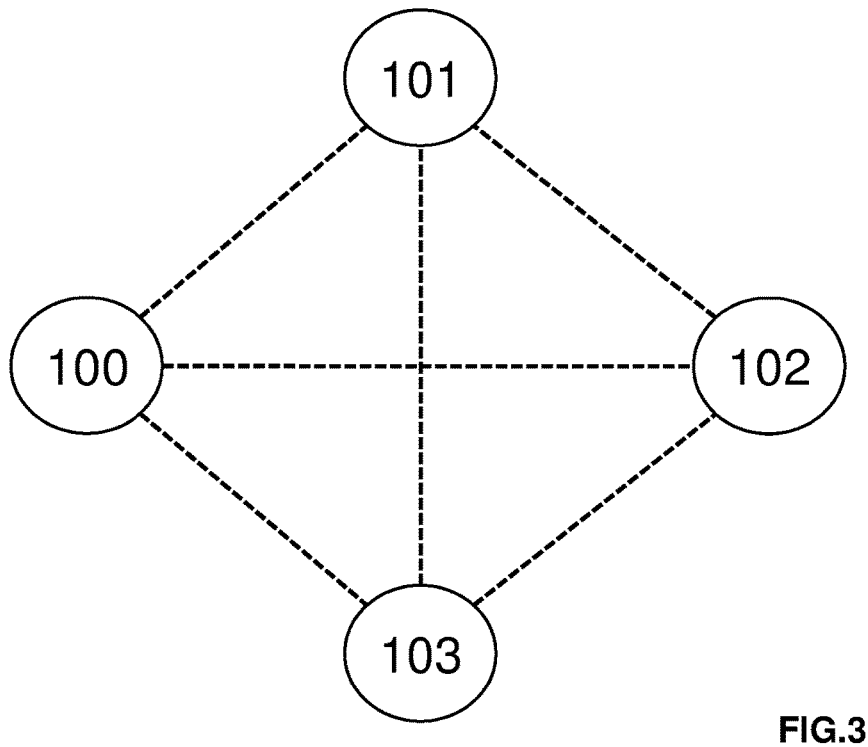
FIG. 3 shows an example schematic view of a network topology with four different devices wherein each of the devices can act as a transmitting device transmitting wireless data to one of the other devices acting as receiver wherein the transmitting device incorporates features of the invention.

FIG. 3 shows a situation in which a transmitting device 100 transmits messages to one of the other devices 101, 102 or 103 which play the role of the target device. The transmission occurs over a wireless network, e.g., using the Bluetooth technology. Each of the devices 100 to 103 can operate in the advertising or extended advertising mode as discussed above in connection with FIGS. 1 and 2. Accordingly each of the devices 100 to 103 are Bluetooth enabled devices which can operate in an extended advertising mode. In the following device 101 will be the target device for a message transmitted by device 100.

As discussed below a method is provided in which the occupancy of the primary and secondary advertising channels over time is determined. Then, as a second part a procedure is provided to select the transmission opportunity for the transmitting device 100 such that the interferers, the devices 102 or 103 are possibly tuned on the secondary advertising channels and the intended target device is available in the primary advertising channel. In the example discussed below it is assumed that the target device is device 101. Accordingly transmitting device 100 wants to transmit a message to device 101. In this scenario it should be ensured that the target device 101 is not occupied with receiving (for example on a secondary channel) at the time where the transmitting device plans to transmit the message either in the primary channel or on the secondary channel to the target device 101. At least the probability should be increased that the target device 101 is not occupied with receiving data from another device (for example from device 102 or 103).

The method for selecting a transmission opportunity in the extended advertising mode is discussed in more detail in connection with FIG. 5. In a first step S51 the transmitting device 100 selects a transmission opportunity for the advertising indication and for the auxiliary packet of the extended advertising mode. In step S52 the transmitting device scans the primary advertising channels for advertising indications (for example from devices 101, 102 or 103) and processes all received advertisement indications. The scanning may be already started in advance of step S51. In step S53 it is checked whether any advertising indication(s) transmitted by one of the other devices is received. If this is not the case the advertising indication and the auxiliary packet can be transmitted in step S54 (for example from device 100 to device 101) at the transmission opportunity as determined in step S51. Thus if no extended advertising indication is received before the transmission opportunity the transmitting device transmits the message in step S54.

Figure 4:
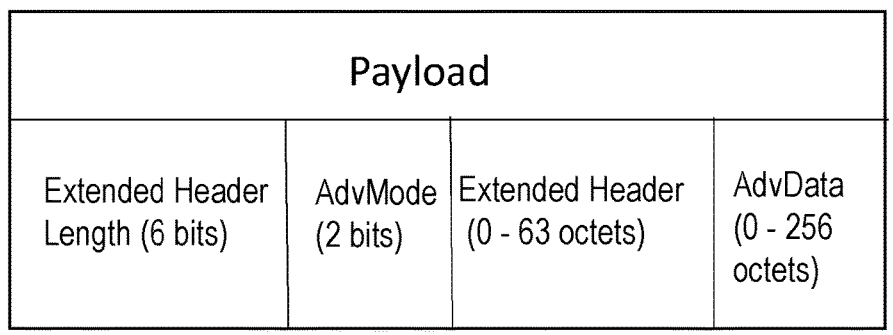
FIG. 4 shows a packet structure used in the extended advertising mode.
Figure 4:
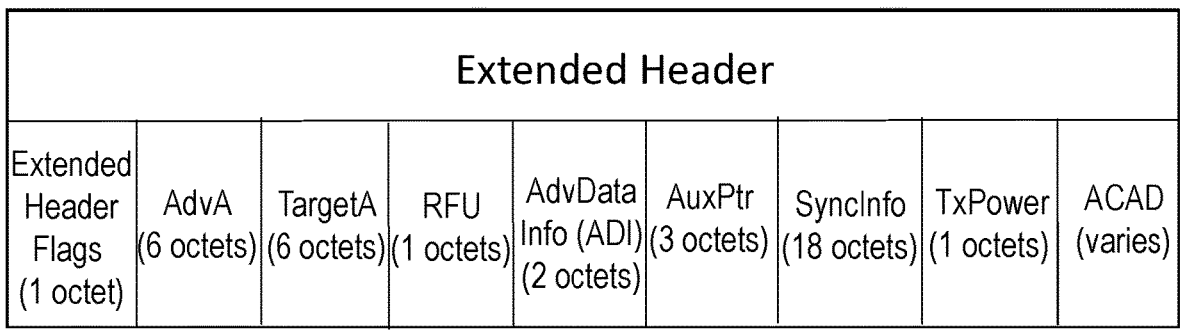

When the step S53 indicates that one or more advertising indications are received from the other devices, the transmitting device determines whether the transmitting device or the target device is involved in any of the received indications. To this end the transmitting device can check the advertiser address (AdvA) and the target address (TargetA) which can be found in the frame structure of an extended advertising packet which is shown in FIG. 4. The transmitting device can store the values of the channel and the time window corresponding to the delay offset at which the auxiliary packets on the secondary channel will be sent (AuxPtr) by the other devices. As indicated in FIG. 4 the advertising address, the target address and the AuxPtr of the channel and the delay offset are all part of the advertising header and are sent unencrypted so that any receiver, such as for example the receiver of the transmitting device 100, can read the header and deduce the required information. When it is determined in step S55 that either the transmitting device or the target device are involved in a transmission scheduled from another device, the method continues in step S56 where it is checked whether the two transmission opportunities selected for the advertising indication and for the auxiliary packet overlap in time with any of the transmissions scheduled by the other devices. If this is the case new transmission opportunities are selected by the transmitting device for the advertising indication and/or for the auxiliary packet by returning to step S51. If the query is negative in step S56 the first message and the second message, i.e. the advertisement indication and the auxiliary packet are transmitted by the transmitting device as planned. This means, that if an overlap in time with the transmission of any of the auxiliary packets scheduled by the other devices in the secondary channels is detected, the transmitting device excludes the transmission opportunities for its packets both in the primary channel and in the secondary channel for the overlapping time. In example if it is assumed that device 101 is the unicast destination of the message transmitted by transmitting device 100, the condition in step S55 is satisfied when an extended advertising indication contains at least one of the following:

AdvA=101,
TargetA=100,
TargetA=101, or

TargetA is not present corresponding to an undirected advertising or broadcast.

Referring again to step S55 when neither the transmitting device nor the target device is involved the method may continue in step S57 where the transmitting device may modify the transmission opportunity of the advertising indication and the transmission opportunity of the auxiliary packet so that they are overlapping in time with the scheduled transmission of at least one auxiliary packet from one of the other devices and may select in step S58 randomly a transmit time for the advertising indication and the auxiliary packets within the identified transmission opportunities. Until the randomly selected transmit time for the advertising indication, the transmitting device may monitor the primary channel for new advertising indications from other devices. Referring to the example given above where it is assumed that device 101 is the unicast destination of the message generated by the transmitting device 100 the condition is satisfied when an extended advertising indication identified by the transmitting device contains at least one of the following pieces of information:

AdvA=102, TargetA=103, or
AdvA=103, TargetA=102.

Accordingly in step S57 a new transmission opportunity for the advertising indication and/or for the auxiliary packets may be determined such that the transmitting device determines an occupied time range in which either the device 102 or 103 is transmitting data in the secondary channel or is receiving data in the secondary channel. The transmitting device 100 then selects a timeslot for the data transmission for either the advertising indication or the auxiliary packet such that the transmission occurs at a time where the other devices 102 and 103 either transmit data or expect to receive data in the secondary channels. This means that devices 102 and 103 will send data in a secondary channel in which neither the transmitting device 100 nor the target device 101 is involved. As a consequence these devices 102 and 103 will not transmit data in the primary channel so that the number of contending devices in the random access channel is reduced. In step S58 within the time ranges in which the other devices 102 or 103 send data in the secondary channel, the transmit time for the advertising indication and/or the auxiliary packets are randomly selected. With steps S57 and S58 the risk that an interfering transmission is started by one of the other devices 102 and 103 is reduced as it was determined that these devices are transmitting or receiving data in a secondary channel where a scheduled transmission is used. When the transmit timeslot has been selected randomly in step S58 the advertising indication is transmitted in the randomly selected transmit time in step S54.

Figure 6:
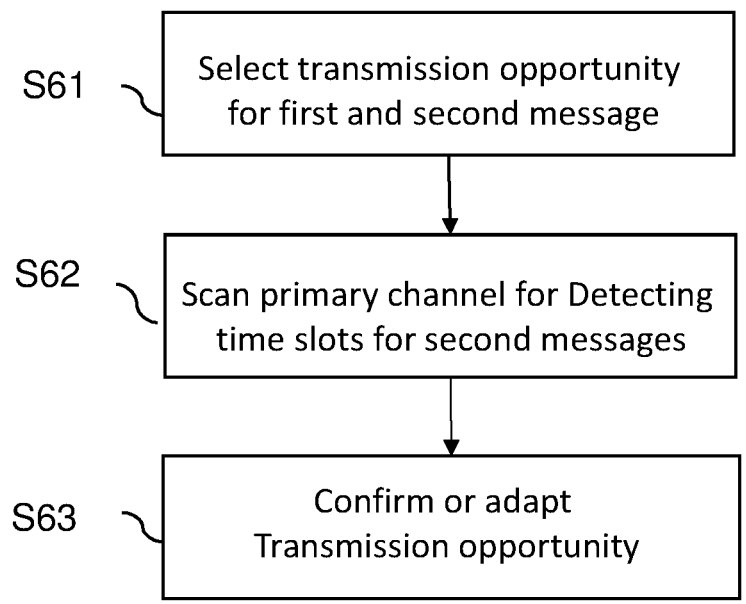
FIG. 6 shows another example flowchart of a method carried out by the transmitting device for transmitting messages to a target device.

FIG. 6 summarizes some of the main steps carried out at the transmitting device.

In a first step S61 the transmitting device determines, for the first message to be transmitted in the random access channel and for the second message to be transmitted in the secondary channel with a scheduled transmission, transmission opportunities wherein the transmission opportunities comprise timeslots for transmitting the first and the second message. In step S62 the transmitting device then scans the primary channel in order to determine and detect messages scheduled in timeslots in which the transmitting device or the target device are involved. This step S62 may correspond to step S55 discussed above in connection with FIG. 5. Depending on the outcome of the scanning of the primary channel the selected transmission opportunities in the primary channel and the secondary channel are either adapted or confirmed in step S63 and as discussed above in more detail in connection with FIG. 5.

Summarizing a procedure is provided to select the transmission opportunities (for example for an auxiliary packet or an advertising indication) in a channel based on the expected availability of the receiver and the unavailability of possible interfering devices.

Figure 5:
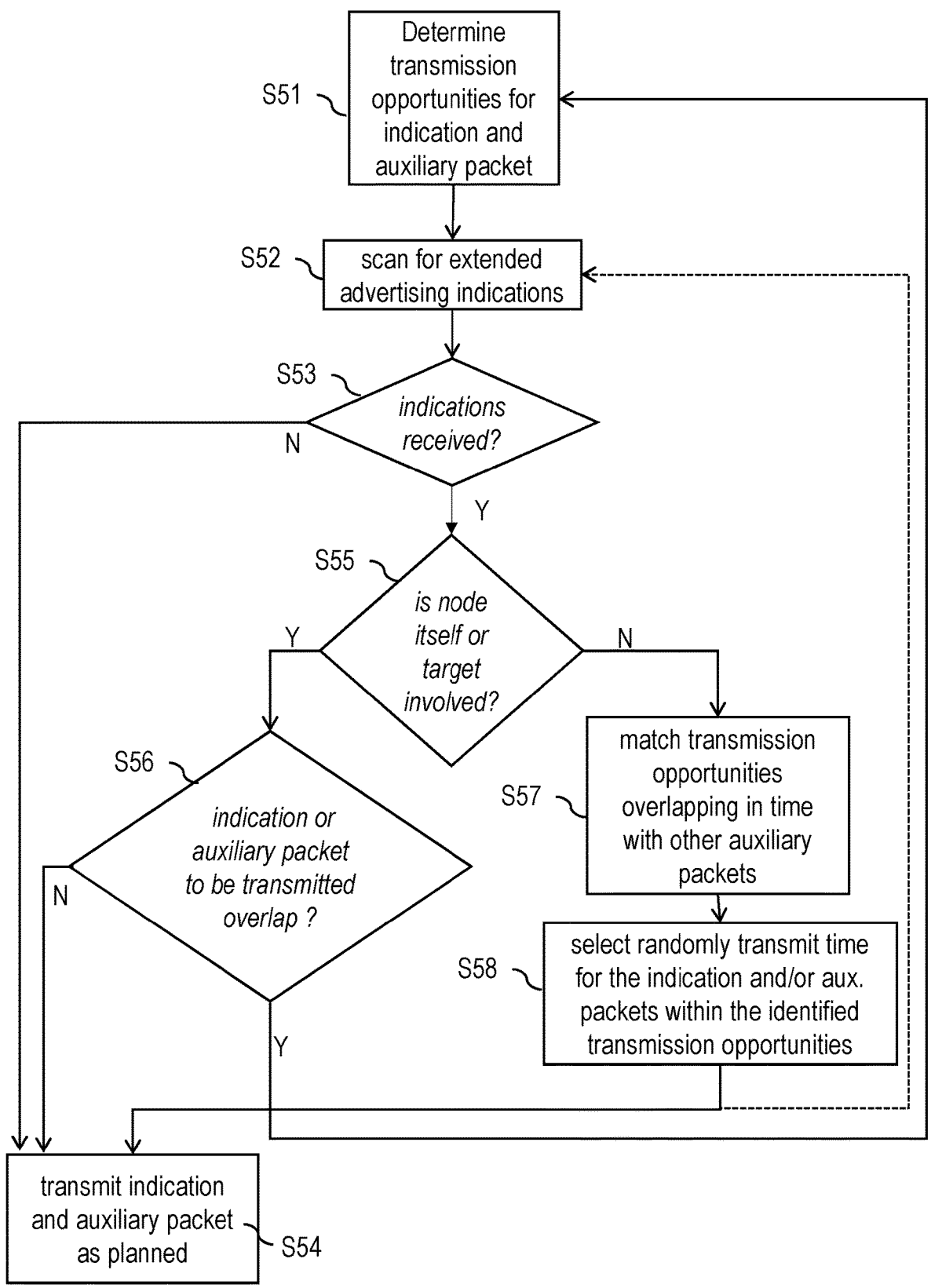
FIG. 5 shows an example flowchart of a method carried out by a transmitting device for transmitting a message to a target device.
Figure 7:
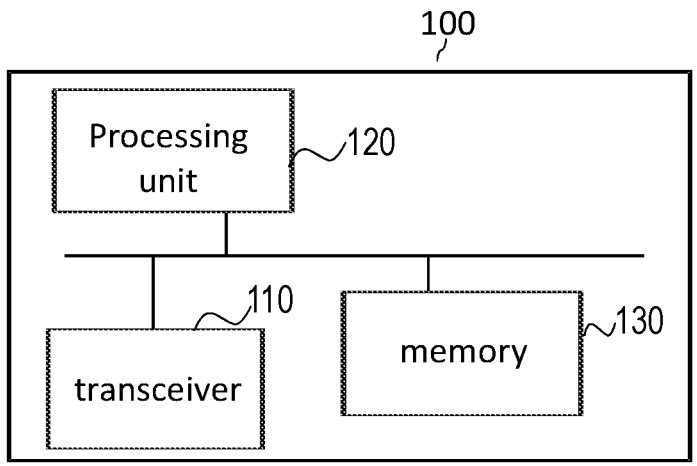
FIG. 7 shows an example schematic representation of a transmitting device configured to transmit messages as shown in FIG. 5 or 6.

FIG. 7 shows a schematic architectural view of transmitting device 100 which can carry out the above discussed transmission procedure shown in FIG. 5 or 6. The transmitting device comprises a transceiver 110 provided for transmitting user data or control messages to other entities such as the devices 102, 103 or 104 wherein the transceiver is adapted to operate in the extended advertising mode and enabled to transmit data in primary advertising channels and secondary advertising channels. The transceiver 110 is furthermore configured to receive user data or control messages from other entities, wherein the received data may be data present in a primary advertising channel or a secondary advertising channel.

The transmitting device furthermore comprises a processing unit 120 which is responsible for the operation of the transmitting device 100. The processing device 120 can comprise one or more processors and can carry out instructions stored on a memory 130, wherein the memory may include a read-only memory, a random access memory, a mass storage, a hard disk or the like. The memory 130 can furthermore include suitable program code to be executed by the processing unit 120 so as to implement the above described functionalities of the transmitting device 100.

Figure 8:
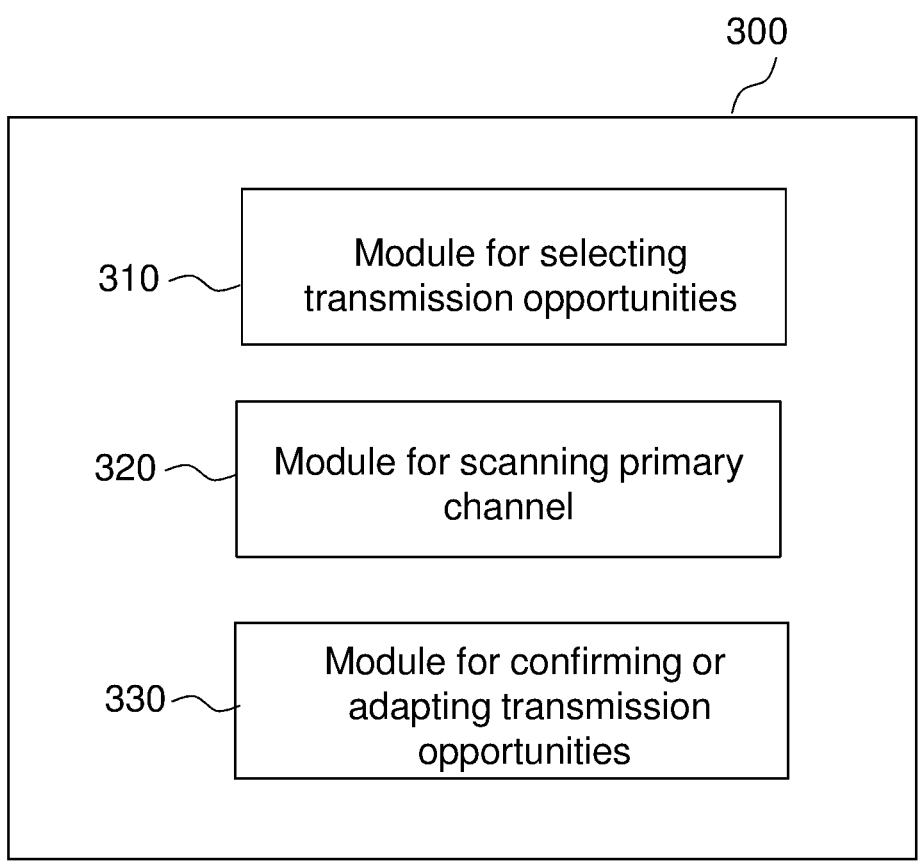
FIG. 8 shows another example schematic representation of a transmitting device configured to transmit messages as shown in FIG. 5 or 6.

FIG. 8 shows another architectural view of a further embodiment of a transmitting device 300 which comprises a first module 310 configured to select for the message transmitted in the primary channel and for the message transmitted in the secondary channel a corresponding transmission opportunity. The transmitting device 300 furthermore comprises a second module 320 configured to scan the primary channel in order to determine whether messages will be transmitted in the selected timeslots in which either the transmitting device or the target device is involved. Furthermore a module 330 is provided configured to either confirm or amend the transmission opportunities as discussed above in connection with FIG. 5. A message may be an advertising indication or a an auxiliary packet as discussed in connection with FIG. 5.

From the above said some general conclusions can be drawn:

As far as the transmitting device 100 is concerned the transmitting device transmits a first message in the primary channel and a second message in the secondary channel. In the first message can be the indication transmitted in the primary advertising channels wherein the second message can be the message transmitted in the secondary advertising channel to a target device receiving the second message in the secondary advertising channel.

The transmitting device scans the primary channel for determining based on the first messages whether a second message is transmitted in a timeslot which was selected by the transmitting device for transmitting the first or second message. The transmitting device may furthermore determine from the first messages a time range when the at least one second message involving the transmitting device or the target device will be transmitted in the secondary channel. The selected transmission opportunities for the first and the second message transmitted by the transmitting device can be confirmed when the at least one second message involving the transmitting device or the target device is detected and when the timeslots selected by the transmitting device for the first and second message are not located in the time range for the at least one second message. As discussed above in connection with FIG. 5 the selected transmission opportunities are maintained when neither the transmitting device nor the target device is involved in step S55 and when no overlap occurs in step S56.

Furthermore it is possible that additional devices other than the transmitting or target device transmit first messages in the at least one primary channel and second messages in the at least one secondary channel such as devices 102, 103. The transmission opportunity for the first message, the second message or for one of these messages is selected such that an occupied time range is determined from the first messages in the at least one primary channel in which at least one of the additional devices is transmitting or receiving in the at least one secondary channel. The transmission opportunity for the first message, the second message or for both messages can be selected such that it is lying in the occupied time range. As discussed above in connection with steps S57 and S58 the transmission opportunities are selected such that the number of interfering devices is minimized as the other devices may transmit or receive data in the secondary channel so that they will not transmit in the primary channel.

The selected transmission opportunity for at least one of the first message and second message can lie in the occupied time range when the selected transmission opportunities are amended based on the result of the scanning wherein the selected transmission opportunities are lying in the occupied time range when it is determined that neither the transmitting nor the target device transmit at least one second message in the timeslots selected for the first or second message. This means that in FIG. 5 selection of step S58 takes place when the answer is no in step S55.

The occupied time range in which the additional devices 102, 103 transmit or receive data in the secondary channel can comprise a plurality of transmission opportunities for transmitting at least one of the first and second message by the transmitting device, wherein one of the transmission opportunities within the occupied time range is randomly selected for the at least one of the first and second message. This corresponds to step S58 discussed above.

Furthermore, when one of the timeslots selected for the at least one of the first and second message intended to be transmitted by the transmitting device overlaps with the determined time range a new transmission opportunity with a new timeslot is determined for the message for which the overlap occurs such that an overlap of the new timeslot with the determined time range is avoided. In step S56 when an overlap occurs and either the transmitting device or the target device is involved, a new transmission opportunity is selected in step S51, wherein the new selection takes into account the information received in steps S53 to S56.

The network can comprise a plurality of secondary channels wherein the primary channel may be scanned in order to deduce the information at which of the secondary channels the second message will be transmitted. As a further option a time range is determined from the primary channel at which the second message will be transmitted in the secondary channel. Furthermore the information can be deduced from the primary channel at which address the target device is reached. Furthermore it is possible to deduce the address of the transmitting device.

Preferably the transmitting device and the target device are Bluetooth enabled devices and the first and the second messages are transmitted using the Bluetooth technology, preferably in accordance with an extended advertising mode.

The advantage of the above described invention is a higher service ratio and a lower delay as the probability of losing packets due to the receiver unavailability at the target device is reduced. Furthermore the number of interfering transmissions on the same primary channel is reduced.

Additionally the reduced probability of losing packets by transmitting data to unavailable users can reduce the power consumption of the source or of the transmitting device depending on the relative consumption of receiving and decoding versus transmitting and also depending on the congestion of the network. Accordingly the above described technology can contribute to increased battery life. The application can be used in Bluetooth networks operating according to the Bluetooth mesh standard and may be used for the operation of dense mesh networks.

The energy efficiency of battery-powered devices in a Bluetooth mesh network operating on extended advertising mode is highly dependent on the ability to correctly detect advertising indications. Devices can setup sleeping schedules during the delay offset before receiving the extended advertising. By reducing the probability that extended advertising indications are missed, the battery consumption due to idle-listening periods is reduced.

The invention claimed is:

1. A method, by a transmitting device, for transmitting messages to a target device over a wireless network, the wireless network comprising at least one primary channel in which first messages are transmitted in a random access procedure, and at least one secondary channel in which second messages are transmitted using a dedicated access procedure with scheduled transmission, wherein each of the first messages transmitted in the primary channel comprises a pointer to the at least one secondary channel, each first message furthermore comprising information about at least the transmitting device transmitting the first and second message and the target device as intended recipient of the first and second message, the method comprising:
   selecting, for each of the first and second message transmitted by the transmitting device, a transmission opportunity comprising at least a time slot for transmitting the corresponding message to the target device,
   scanning the primary channel in order to determine, based on the received first messages, whether at least one second message will be transmitted in the time slots selected for the first or second message in which the transmitting device or the target device is involved,
   confirming or amending the selected transmission opportunities based on a result of the scanning.

2. The method according to claim 1, further determining from the first messages a time range when said at least one second message involving the transmitting device or the target device will be transmitted in the at least one secondary channel, wherein the selected transmission opportunities for the first and second message transmitted by the transmitting device are confirmed when said at least one second message involving the transmitting device or the target device is detected and when the time slots selected by the transmitting device for the first and second message are not located in the time range of said at least one second message.

3. The method according to claim 2, wherein, when one of the time slots selected for the at least one of the first and second message intended to be transmitted by the transmitting device overlaps with the determined time range, a new transmission opportunity with a new time slot is determined for the message for which the overlap occurs such that an overlap of the new time slot with the determined time range is avoided.

4. The method according to claim 1, wherein additional devices other than the transmitting or target device transmit first messages in the at least one primary channel and second messages in the at least one secondary channel, wherein the transmission opportunity for at least one of the first and second message is selected such that an occupied time range is determined from the first messages in the at least one primary channel in which at least one of the additional devices is transmitting or receiving in the at least one secondary channel and that the transmission opportunity for at least one of the first and second message transmitted by the transmitting device is lying in the occupied time range.

5. The method according to claim 4, wherein the selected transmission opportunity for at least one of the first message and second message is lying in the occupied time range when the selected transmission opportunities are amended based on the result of the scanning, wherein the selected transmission opportunities are lying in the occupied time range, when it is determined that neither the transmitting device nor the target device transmit at least one second message in the time slots selected for the first or second message.

6. The method according to claim 4, wherein the occupied time range comprises a plurality of transmission opportunities for transmitting the at least one of the first and second message by the transmitting device, wherein one of the transmission opportunities within the occupied time range is randomly selected for the at least one of the first and second message.

7. The method according to claim 1, wherein a plurality of the secondary channels are provided, wherein the primary channel is scanned in order to deduce the following information:
  at which of the secondary channels the second message will be transmitted,
  a time range at which the second message will be transmitted in the secondary channel,
  an address of the target device,
  an address of the transmitting device.

8. The method according to claim 1, wherein the transmitting and the target device are Bluetooth enabled devices, and the first and second messages are transmitted using the Bluetooth technology.

9. The method according to claim 8, wherein the first message and the second message are messages exchanged in accordance with an extended advertising mode.

10. A transmitting device configured to transmit messages to a target device over a wireless network, the wireless network comprising at least one primary channel in which first messages are transmitted in a random access procedure, and at least one secondary channel in which second messages are transmitted using a dedicated access procedure with scheduled transmission, wherein each of the first messages transmitted in the primary channel comprises a pointer to the at least one secondary channel, each first message furthermore comprising information about at least the transmitting device transmitting the first and second message and the target device as intended recipient of the first and second message, the transmitting device comprising a memory and at least one processing unit, the memory comprising instructions executable by the at least one processing unit, wherein the transmitting device is operative to:
  select for each of the first and second message transmitted by the transmitting device, a transmission opportunity comprising at least a time slot for transmitting the corresponding message to the target device,
  scan the primary channel in order to determine, based on the received first messages, whether at least one second message will be transmitted in the time slots selected for the first or second message in which the transmitting device or the target device is involved,
  confirm or amend the selected transmission opportunities based on a result of the scanning.

11. The transmitting device according to claim 10, further being operative to determine from the first messages a time range when said at least one second message involving the transmitting device or the target device will be transmitted in the at least one secondary channel, and operative to confirm the selected transmission opportunities for the first and second message transmitted by the transmitting device when said at least one second message involving the transmitting device or the target device is detected and when the time slots selected by the transmitting device for the first and second message are not located in the time range of said at least one second message.

12. The transmitting device according to claim 11, further being operative, when one of the time slots selected for the at least one of the first and second message intended to be transmitted by the transmitting device overlaps with the determined time range, to determine a new transmission opportunity with a new time slot for the message for which the overlap occurs such that an overlap of the new time slot with the determined time range is avoided.

13. The transmitting device according to claim 10, wherein additional devices other than the transmitting or target device transmit first messages in the at least one primary channel and second messages in the at least one secondary channel, the transmitting device being operative to select the transmission opportunity for at least one of the first and second message such that an occupied time range is determined from the first messages in the at least one primary channel in which at least one of the additional devices is transmitting or receiving in the at least one secondary channel and that the transmission opportunity for at least one of the first and second message transmitted by the transmitting device is lying in the occupied time range.

14. The transmitting device according to claim 13, wherein the selected transmission opportunity for at least one of the first message and second message is lying in the occupied time range when the transmitting device amends the selected transmission opportunities based on the result of the scanning, wherein the selected transmission opportunities are lying in the occupied time range, when the transmitting device determines that neither the transmitting device nor the target device transmit at least one second message in the time slots selected for the first or second message.

15. The transmitting device according to claim 13, wherein the occupied time range comprises a plurality of transmission opportunities for transmitting the at least one of the first and second message by the transmitting device, wherein the transmitting device is operative to randomly select one of the transmission opportunities within the occupied time range for the at least one of the first and second message.

16. The transmitting device according to claim 10, wherein a plurality of the secondary channels are provided, the transmitting device being operative to scan the primary channel in order to deduce the following information:
  at which of the secondary channels the second message will be transmitted, a time range at which the second message will be transmitted in the secondary channel,
an address of the target device,
an address of the transmitting device.

17. The transmitting device according to claim 10, further being a Bluetooth enabled transmitting device operative to transmit the first and second messages using the Bluetooth technology.

18. The transmitting device according to claim 17, further being operative to exchange the first message and the second message in accordance with an extended advertising mode.

19. A computer program comprising program code to be executed by at least one processing unit of a transmitting device for transmitting messages to a target device over a wireless network, the wireless network comprising at least one primary channel in which first messages are transmitted in a random access procedure, and at least one secondary channel in which second messages are transmitted using a dedicated access procedure with scheduled transmission, wherein each of the first messages transmitted in the primary channel comprises a pointer to the at least one secondary channel, each first message furthermore comprising information about at least the transmitting device transmitting the first and second message and the target device as intended recipient of the first and second message, wherein execution of the program code causes the at least one processing unit to:
  select, for each of the first and second message transmitted by the transmitting device, a transmission opportunity comprising at least a time slot for transmitting the corresponding message to the target device,
  scan the primary channel in order to determine, based on the received first messages, whether at least one second message will be transmitted in the time slots selected for the first or second message in which the transmitting device or the target device is involved, and
  confirm or amend the selected transmission opportunities based on a result of the scanning.

20. A carrier comprising the computer program of claim 19, wherein the carrier is a computer readable storage medium.

* * * * *